July 2, 1968 — A. M. SCHAIBLE ET AL — 3,390,515
BREAKAWAY MECHANISM
Filed Oct. 20, 1965 — 3 Sheets-Sheet 1
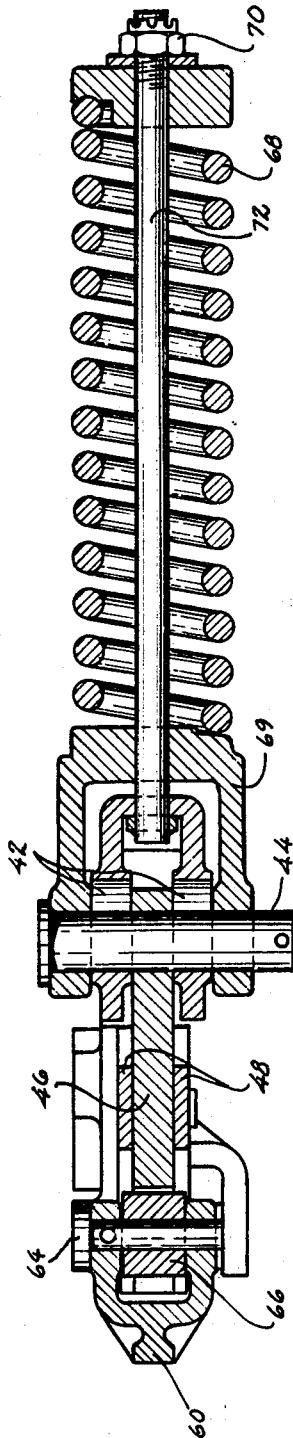
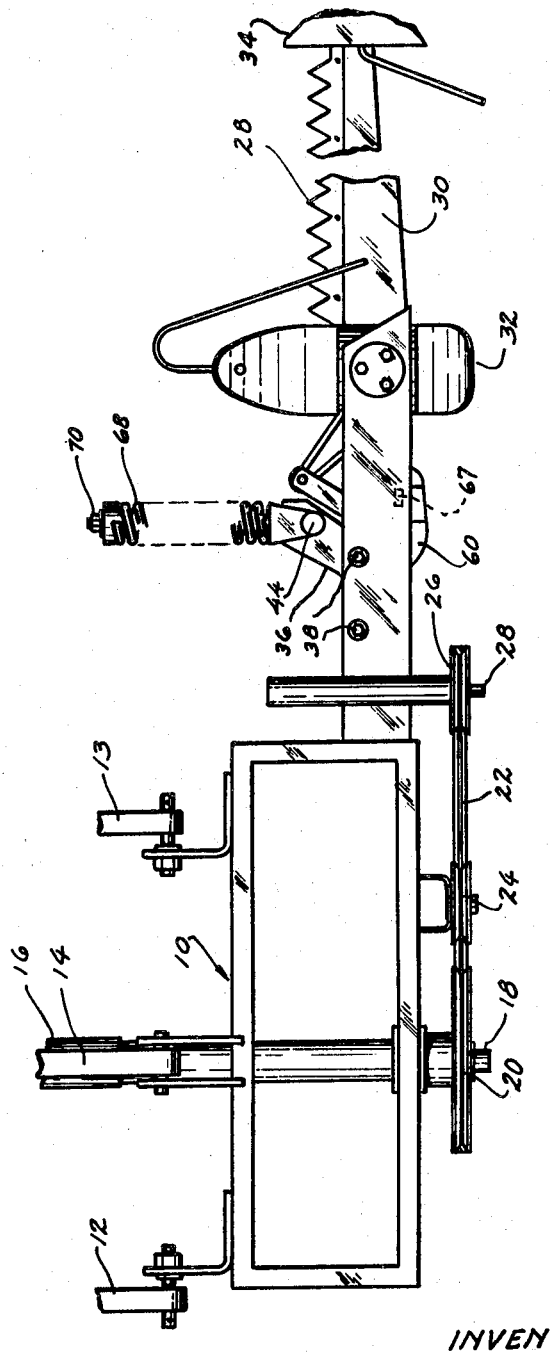
INVENTORS.
AARON M. SCHAIBLE.
MARVIN L. JANSSEN.
BY.
Geo. J. Muckenthaler ATT'Y
Robert D. Godard AG'T

INVENTORS.
AARON M. SCHAIBLE.
MARVIN L. JANSSEN.

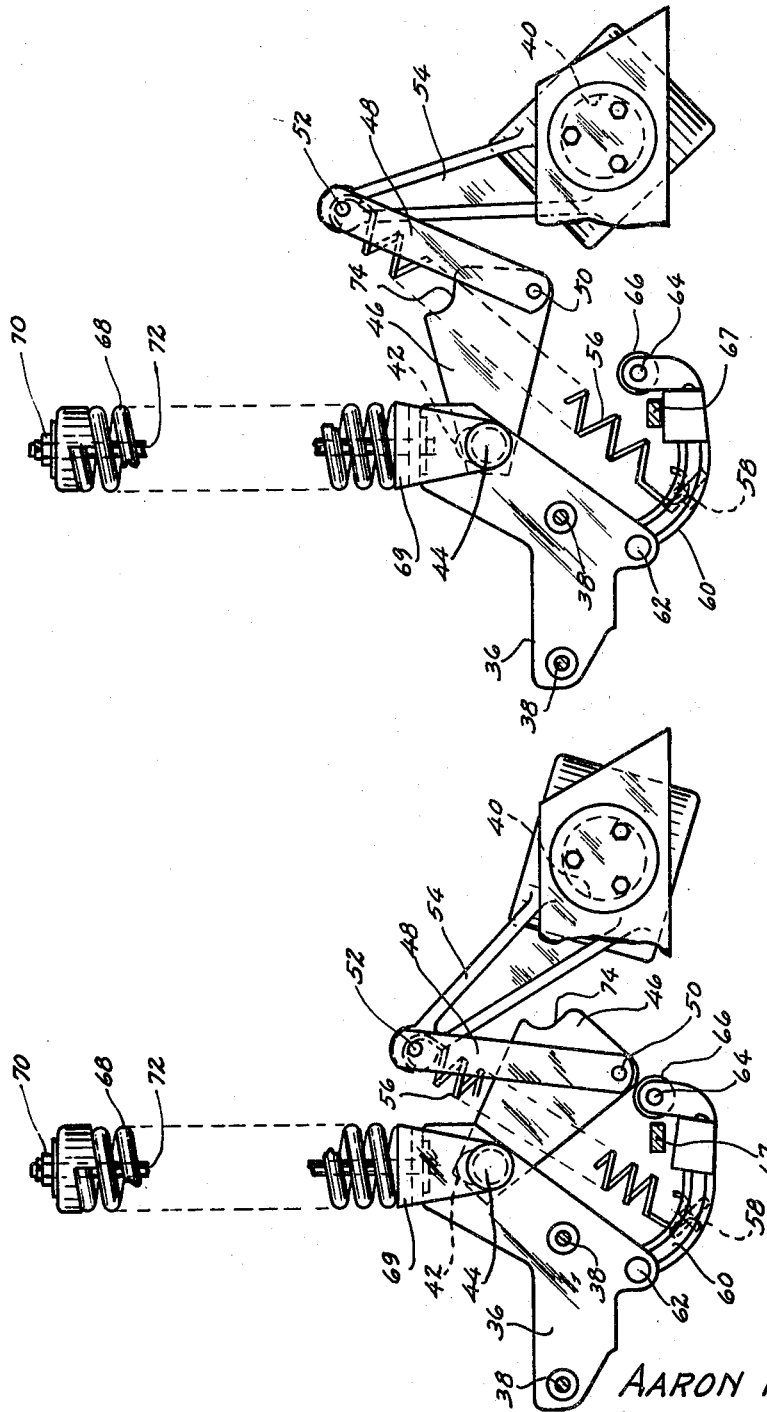

United States Patent Office 3,390,515
Patented July 2, 1968

3,390,515
BREAKAWAY MECHANISM
Aaron M. Schaible, Rockford, and Marvin L. Janssen, Champaign, Ill., assignors to J. I. Case Company, Racine, Wis., a corporation of Wisconsin
Filed Oct. 20, 1965, Ser. No. 498,944
12 Claims. (Cl. 56—25)

This invention relates to agricultural implements and more particularly to harvesters or mowers which use a cutting mechanism on standing crop material. Many of these cutting mechanisms or cutter bars are mounted on the rear of a tractor, and in this instance the cutter bar forms a part of the tractor-mounted mower. Mowers for cutting crop material are generally of three types, the side-mounted mower, the rear-mounted mower, and the pull or trail type mower. While the invention will be described and illustrated as part of a rear-mounted mower, it could be adapted for use with either of the other commonly used types.

A common and conventional feature of the tractor-mounted mower is some means for allowing the cutter bar to breakback or breakaway from the normal operating position when the cutter bar hits an obstruction. If the bar hits an immovable object, such as a fence post or an object of sufficient size such that the cutters cannot cut through, the cutters and perhaps the bar and the drive mechanism would be seriously damaged. The breakaway means allows the cutter bar to swing rearwardly and thus helps to prevent the serious damage.

A breakback means or a mechanism release has been used on mowers in the past, and this invention is designed to improve the breakaway mechanism and to provide a cushioned breakaway action. The higher tractor speeds and the higher rate of reciprocation of the cutting elements on the mower require that the breakaway means be improved to withstand the greater forces to be expected under these operating conditions.

The principal object of this invention is to provide an improved breakaway means for mowers.

A further object is to provide a breakaway means which is simple, rugged, and dependable.

Another object is to provide a breakaway mechanism which provides a cushioned release from the normal operating position.

An additional object is to provide a breakaway means which assists in returning the cutter bar from the breakback position to the operating position.

Further objects and advantages will be apparent from the following specification and the annexed drawings, in which:

FIGURE 1 is a fragmentary plan view of a mower showing the invention;

FIG. 4 is a view of the same in a position just after the breakaway operation;

FIG. 5 is a view of the mechanism in the breakaway position; and

FIG. 6 is a view taken on the line 6—6 of FIG. 2.

Figure 3:
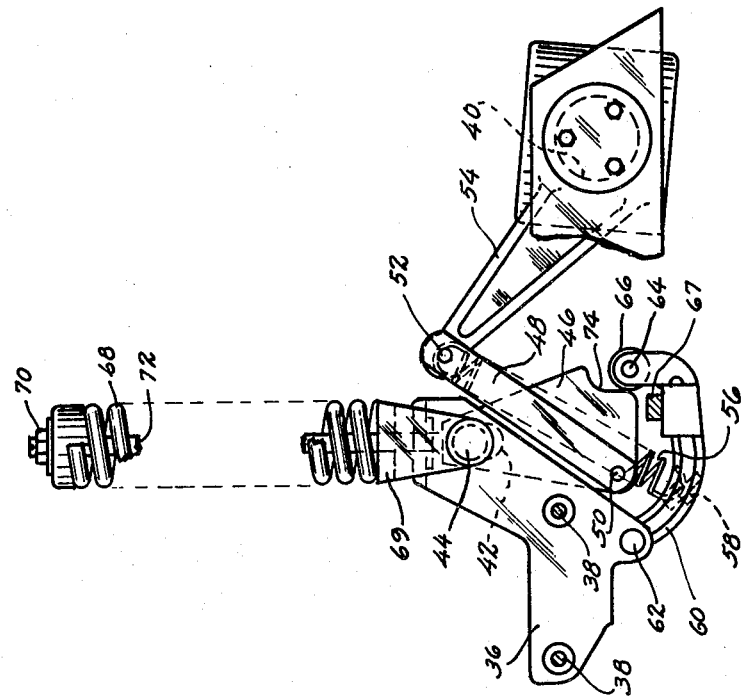
FIG. 3 is a view of the same in a position just before breakaway operation.

In FIG. 1, is shown a mower frame generally designated as 10, which is mounted on the rear of a tractor, not shown, by means of a conventional three-point hitch, which includes side hitch members 12 and 13, and a top hitch member 14. As stated above, the invention will be described as a part of a rear-mounted tractor mower. A conventional power take-off 16 is driven from the tractor and which in turn drives the main shaft 18 of the mower. Shaft 18 has fixed thereon, a main pulley 20 which drives a belt 22 over an idler pulley 24, and a belt 22 also drives a pulley 26 which pulley is on a shaft 28 on the frame 10. Shaft 28 drives mechanism for imparting a reciprocating motion to a conventional sickle 28 carried on a cutter bar 30. The drive mechanism for the sickle may be a crank and pitman drive, or it may be a modified eccentric drive, and since the drive forms no part of the present invention, it will not be further described. Adjacent and to the right of the mower frame 10 is an inner shoe 32 which is a part of the conventional cutter bar. The other end of cutter bar 30 carries an outer shoe 34 which supports that end of the cutter bar in well-known manner.

The mower frame 10, the driving mechanism for the sickle, and the cutter bar 30 are not a part of this invention and need not be further described except as they relate to the invention itself.

Figure 2:
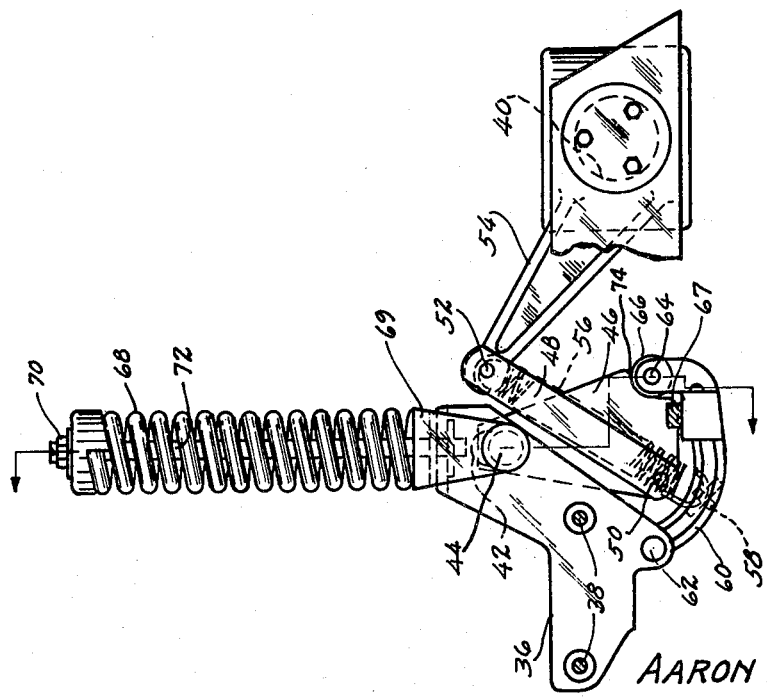
FIG. 2 is an enlarged view of the mechanism in a normal operating position.

The invention comprises an improved breakaway or breakback mechanism which is a departure from the conventional breakback arrangement in that it provides a cushion for limited rearward movement of the cutter bar without breakback, and it provides a spring loaded mechanism for assistance in returning the cutter bar to the operating or locked position after complete breakback. Fixed to the main frame 10 is a mounting or supporting plate 36 which is secured to the frame by means of bolts 38, as seen in FIGS. 1 and 2. This mounting plate is preferably mounted under a portion of the mower frame between the driving mechanism and the inner shoe, and is disposed generally in a horizontal position and secured to the frame to provide a strong and rugged construction. The embodiment disclosed shows a substantially triangular-shaped plate, but which could be in modified shapes and forms for other arranged structures. The cutter bar 30 is pivotally supported at the mower head pivot 40 so that the cutter bar and the sickle can be swung to a rearward position whenever the cutter bar encounters an obstruction. The relationship of the pivot point and the breakaway mechanism will be described later.

The first plate of the breakaway mechanism or the mounting plate 36, as stated above, is securely fastened to the mower frame. Mounting plate 36 has a slot 42 near the forward edge of the plate which slot is positioned or disposed in a fore-and-aft direction in relation to the direction of travel of the mower. Plate 36 also acts as a detent plate or element which will be further described as part of the breakaway mechanism. A pin 44 is positioned in slot 42 of plate 36, the pin acting in relation with the plate as a lost motion connection in a fore-and-aft direction in the slot. A detent or control plate 46 is pivoted on pin 44, which pin extends through slot 42 and through the forward portion of plate 46. Plate 46 is rotatable on pin 44 as stated, and also is reciprocable, by reason of the lost motion connection, as will be described later.

A link 48 is pivotally connected to plate 46 by means of a pin 50. An arm or lever 54 is pivotally connected to link 48 by means of a pin 52 and is also connected to the cutter bar point of rotation on mower head pivot 40. As seen in FIGS. 4 and 5, a resilient means or spring 56 is connected to arm 54 at one end thereof and secured by pin 52. The other end of spring 56 is connected to a release means or dog 60 on a lug 58. The release means 60 is pivotally connected to the mounting plate 36 on a pin 62. The release arm 60 has a roller 66 at one end secured by a pin 64, and roller 66 engages with a portion of control plate 46, as seen in FIGS. 2 and 3, and forms a cam means for retaining plate 46 in the normal operating position of the cutter bar. A stop 67 is attached to the mower which limits the swinging of the release dog 60.

A compression spring 68 is secured to the mounting plate 36 by means of the pin 44 which extends thru the slot 42. Compression spring 68 is held in position by pin 44 and by a bifurcated base member 69 positioned over the one end of plate 36. Spring 68 is secured by means of a nut 70 on one end of an anchorage 72 which retains the spring in a preset compressed condition. In the normal operating condition, and as seen in FIG. 2, the spring 68 is holding and compressing against control plate 46 so that pin 44 is at one end of slot 42 and in the direction of release dog 60. Control plate 46 has a notched or recess surface portion 74, as seen in FIGS. 2 and 3, which engages with roller 66, and in the normal operating position, plate 46 is held by the release dog 60 under the compression of spring 68 so that plate 46 cannot become disengaged from roller 66 except during abnormal rearward forces on the cutter bar.

During normal operation, the forces on the mower cutter bar cause the connecting link 48 to be in a tension condition and spring 68 to be under compression and a resultant clockwise torque is applied to the mower head. As the forces on the cutter bar increase, due to an unusually heavy crop growth or under adverse cutting conditions, an increased clockwise torque is applied to the mower head and the tension in link 48 increases, thus tending to move the control plate in the direction of and increasing the compression in spring 68, and exerting forces in the connecting link 48 to increase above the preload in the compression spring 68. The control plate 46 slides forward in the slot 42 in mounting plate 36 and allows the cutter bar 30 to move slightly on the mower head pivot 40. As forces on the cutter bar increase, as seen in FIG. 3, the control plate moves forward in the direction of spring 68 so that the release dog 60 cams out of the recess slot or surface 74 in control plate 46, and the control plate rotates around pin 44, as seen in FIG. 4, and allows free breakaway of the cutter bar 30. Rotation of the cutter bar around the mower head axis of rotation extends and increases the force in the assist return tension spring 56 as seen in FIGS. 4 and 5. During the full breakaway operation spring 56 is extended to its full position and the breakaway action is complete. Stop 67 retains release dog 60 from rotating in a counterclockwise direction when the cutter bar is in the breakaway position.

The tension in spring 56, due to the forces on the spring in the extended position, assists the operator in returning the cutter bar to the home or normal operating position. As the cutter bar is rotated back into operating position, the release dog 60 rotates and cams along the edge of the control plate 46 until it is forced into home position by the tension in the assist return spring 56. The backward motion of the release dog 60 allows the mechanism to be reloaded without compressing the compression spring 68. Thus it can be seen in FIGS. 2, 3, 4 and 5, that the operation of the breakaway means causes the arm 54 and pivot pin 52 to move in a clockwise direction around the mower head pivot as the forces on the cutter bar increase to an unusually large amount, which rotational motion will cause plate 46 to cam or slip out of position in relation to release dog 60. During normal operation, the compression spring 68 exerts a force in a rearward direction toward the release dog 60 tending to keep plate 46 engaged with dog 60. Due to the varying forces on the cutter bar, the compression spring is moving in a fore-and aft direction in minute amounts and plate 46 is also moving in this direction with pin 44 moving back and forth in slot 42. This lost motion action is to take the effect of the small uneven forces acting on the cutter bar, and which are not large enough to cause a complete breakaway operation. As the force on the cutter bar increases, spring 68 is moved into a more compressed condition due to the increased rotational forces on arm 54, and causes a further tension in link 48 and an extension of spring 56 so that plate 46 is urged to a forward position and pin 44 is moved nearer one end of slot 42. Thus, the control plate 46 reciprocates in a fore-and-aft direction until the forces become sufficient to disengage plate 46 from the release dog 60. Release dog 60 is moved in a clockwise direction away from stop 67 as control plate 46 cams away from roller 66. When the cutter bar is returning to normal operating position, release dog 60 is again moved away from stop 67 by reason of plate 46 contacting roller 66 and the control plate 46 swings clockwise and seats surface 74 on roller 66. The return spring 56 assists the operator when he backs the tractor and mower to position the control plate and the release dog for normal operation.

It will therefore be seen that herein described is an improved breakaway mechanism for a mower which is simple, rugged and dependable, which provides a cushioned release from the normal operating position, and which provides an assist means in returning the cutter bar from the breakback position of the operating position. While only one embodiment has been disclosed, it will be apparent that alterations and variations of the breakback means could be made; and while the disclosure shows a mower attached and carried on the rear end of a tractor, the mower could be carried as a side-mounted mower, and the device could be operated in a similar manner.

Other variations may occur to those skilled in the art, and it is to be understood that the invention is not limited by the specific embodiment described and illustrated, or in fact, in any manner except as defined in the following claims.

What is claimed as new and desired to be secured by Letters Patent of the United States is:

1. In a breakback mechanism for a mower of the type including a frame, and a cutter bar pivoted to the frame for rearward swinging movement, means for preventing such rearward swinging movement including:
   an arm fixed on the cutter bar,
   a detent plate rotatable on the frame and spaced from the arm,
   a link connected to the arm and to the detent plate in a position to cause swinging of the plate by reason of swinging of the arm,
   a detent fixed in relation to said frame and engaged with the plate in a position to prevent rotation thereof, and yieldable means connected to said frame, engaged with said detent plate and positioned to exert force on said plate in a direction opposite to that induced by said link by reason of swinging of said arm, said detent being positioned to guide said plate for movement until such movement in opposition to said yieldable means shifts said plate beyond the region of contact with said detent so that said plate escapes from said detent to be swung by said link, whereupon said link will permit said arm and cutter bar to swing about said pivot upon encountering an obstruction.

2. In a breakback mechanism for a mower of the type including a frame, and a cutter bar pivoted to the frame for rearward swinging movement, means for preventing such rearward swinging movement including:
   an arm rigid with the cutter bar,
   a detent plate reciprocable and rotatable on the frame and spaced from the arm,
   a link connected to the arm and to the detent plate in a position to cause swinging and reciprocation of the plate by reason of swinging of the arm,
   a detent fixed in relation to said frame and engaged with the plate in a position to prevent rotation thereof, and yieldable means connected to said frame, engaged with said detent plate and positioned to exert force on said plate in a direction opposite to that induced by said link by reason of swinging of said arm, said detent being positioned to guide said plate for reciprocating movement until such reciprocating movement in opposition to said yieldable means shifts said plate beyond the region of contact with said detent so that said plate escapes from said detent to be swung by said link, whereupon said link will permit said arm and cutter bar to swing about said pivot upon encountering an obstruction.

3. A breakway means for a mower of the type having a frame, a reciprocable cutting mechanism on said frame and having an axis of rotation substantially vertical of said cutting mechanism, said breakway means including:
- a mounting plate on said frame,
- a control plate pivotally connected to said mounting plate, release means on said mounting plate engageable with said control plate,
- a link means connected to said control plate and to said cutting mechanism in position to swing said control plate, compression means connected to said mounting plate and control plate, and extending in a forward direction from said mounting plate to urge said control plate against said release means, and
- resilient means connected to said release means and to said link means for retaining said cutting mechanism in one position and for allowing said mechanism to breakway about said axis of rotation when said mechanism encounters a force of sufficient magnitude to overcome said compression means.

4. A breakaway means for a mower of the type having a frame, a reciprocable cutting mechanism on said frame and having an axis of rotation substantially vertical of said cutting mechanism; said breakway means including a mounting plate on said frame disposed generally horizontal of said cutting mechanism,
- a control plate pivotally connected to said mounting plate, release means on said mounting plate engageable with said control plate in one position of said control plate,
- link means connected to said control plate and to said cutting mechanism in position to cause swinging of said control plate,
- compression means connected to said mounting plate control plate,
- extending in a forward direction from said mounting plate, and urging said control plate against said release means, and
- resilient means connected to said release means and to said link means for retaining said cutting mechanism in one position and for allowing said mechanism to breakaway about said axis of rotation when said mechanism encounters a force of sufficient magnitude to overcome said compression means.

5. A breakaway mechanism for a mower of the type having a mobile frame, a pivot on the frame, and a cutter bar on the pivot extending outwardly from the frame in a direction transverse to the direction of travel of the mower, means for propelling the frame, and means for actuating the cutter bar, said breakaway mechanism including a relatively stationary detent element, a reciprocable detent element engaged with said stationary detent element, and having a surface extending substantially parallel to the direction of reciprocation of said reciprocable detent element, resilient means anchored to said frame, connected to said reciprocable detent element and positioned to urge said reciprocable detent element yieldably in one direction and means connected with said reciprocable detent element and with said cutter bar and positioned to reciprocate said reciprocable detent element in the other direction and to tend to move said reciprocable detent element toward said relatively stationary detent, said surface being positioned so that said reciprocable detent element may become detached from said stationary detent element by reason of its reciprocating movement and be rotated by movement of said cutter bar about said pivot thereby freeing said cutter bar for rearward swinging movement about said pivot, by reason of hitting an obstruction.

6. A breakaway mechanism for a mower of the type having a mobile frame, a pivot on the frame, and a cutter bar on the pivot extending outwardly from the frame in a direction transverse to the direction of travel of the mower, means for propelling the frame, and means for actuating the cutter bar; said breakaway mechanism including a relatively stationary detent element, a reciprocable and rotatable detent element engaged with said stationary detent element, and having a surface in contact with said stationary detent element extending substantially parallel to the direction of reciprocation of said reciprocable detent element, resilient means anchored to said frame, connected to said reciprocable detent element and positioned to urge said reciprocable detent element yieldably in one direction and means connected with said reciprocable detent element and with said cutter bar and positioned to reciprocate said reciprocable detent element in the other direction and to tend to rotate said reciprocable detent element toward said relatively stationary detent, said surface being of a length whereby said reciprocable detent element by reason of its reciprocating movement and be rotated by movement of said cutter bar about said pivot thereby freeing said cutter bar for rearward swinging movement about said pivot by reason of hitting an obstruction.

7. An improved breakaway means for a mower of the type having a frame and a reciprocable cutter bar carried on the frame, said breakaway means including:
- a first plate on said frame for mounting said breakaway means, said first plate having a slot therein,
- a second plate connected to said first plate and movable along said slot,
- a link having one end connected to said second plate,
- an arm having one end connected to said cutter bar and the other end connected to the other end of said link,
- a first spring having one end connected to said second plate and extending generally forwardly of said first plate, and urging said second plate toward one end of said slot,
- release means on said first plate positioned to engage with said second plate, and
- a second spring having one end connected to said release means and the other end connected to said arm whereby pressure on said cutter bar will cause said cutter bar to pivot after said second plate disengages from said release means.

8. An improved breakaway means for a mower of the type having a frame and a reciprocable cutter bar carried on the frame; said breakaway means including:
- a first plate on said frame for mounting said breakaway means, said first plate having a slot therein,
- a second plate pivotally connected to said first plate and movable along said slot,
- a link having one end piovtally connected to said second plate,
- an arm having one end connected to said cutter bar and the other end pivotally connected to the other end of said link,
- a first spring having one end connected to said second plate and extending generally forwardly of said first plate, urging said second plate toward one end of said slot, and said spring being formed to compress as said second plate moves along said slot,
- release means on said first plate positioned to engage with said second plate, and
- a second spring having one end connected to said release means and the other end connected to said arm whereby pressure on said cutter bar will cause said cutter bar to pivot after said second plate disengages from said release means.

9. A breakway mechanism for a mower of the type having a frame and a cutting means on the frame having an axis of rotation; said mechanism including:
- a mounting plate on said frame, said plate having a slot spaced from the forward edge thereof,
- a control plate connected to said mounting plate and movable along said slot,
- a connecting link having one end connected to said control plate, a lever having one end connected to said cutting means and the other end connected to the other end of said connecting link, a compression spring having one end connected to said control plate to urge said control plate toward one end of said slot, a release dog on said mounting plate and positioned to engage with said control plate, and a tension spring having one end connected to said release dog and the other end connected to said lever whereby excessive force on said cutting means will cause said cutting means to rotate about said axis and urge said control plate out of engagement with said release dog and thereby allow said cutting means to breakaway from its operating position and the resulting increased tension in said tension spring will assist the return of said cutting means from a breakback position to an operating position.

10. A breakaway mechanism for a mower of the type having a frame and a cutting means on the frame having an axis of rotation substantially vertical of said cutting means; said mechanism including:

a mounting plate on said frame disposed generally horizontal of said cutting mechanism, said plate having a slot spaced from the forward edge thereof, a control plate pivotally connected to said mounting plate and movable along said slot, a connecting link having one end pivotally connected to said control plate, a lever having one end connected to said cutting means and the other end pivotally connected to the other end of said connecting link, a compression spring having one end connected to said control plate and extending forwardly of said mounting plate, and urging said control plate toward one end of said slot, a release dog on said mounting plate and positioned to engage with said control plate, and a tension spring having one end connected to said release dog and the other connected to said lever whereby excessive force on said cutting means will cause said cutting means to rotate about said axis and urge said control plate out of engagement with said release dog and thereby allow said cutting means to breakaway from its operating position and the resulting increased tension in said tension spring will assist the return of said cutting means from a breakback position to an operating position.

11. A breakaway mechanism for a mower of the type having a frame and a cutter bar pivoted on the frame and extending in a direction transverse to the direction of travel of the mower, said breakway mechanism including a lever fixed in relation to and extending generally forward of said cutter bar adjacent said frame, a first plate fixed on said frame adjacent said lever and defining a fore-and-aft direction slot, a swingable second plate connected to said first plate, guide means on said second plate positioned to move said second plate along said slot, a link connected to said lever and to said second plate and positioned to swing said second plate about the connection of said first and second plate, a compression spring extending forwardly of said first plate and having one end connected to said second plate and positioned to exert a force on said second plate tending to displace said second plate in the direction of the slot, an anchorage connected to said first plate and to the other end of said compression spring, a release arm pivotally connected at one end to said first plate and positioned to engage with said second plate to prevent swinging of said second plate, said arm having a roller at its other end for mating with said second plate in one position of said arm and said second plate, and said arm having a stop means positioned to engage with said frame to prevent swinging of said arm, and a tension spring connected at one end to said release arm and connected at the other end to said lever and to said link and being positioned to tend to rotate said second plate in one direction and to urge said release arm roller in contact with said second plate in one position of said breakaway mechanism and said tension spring also being positioned in another position of said breakaway mechanism by reason of said cutter bar encountering an obstruction, to tend to rotate said second plate in the other direction.

12. A breakaway mechanism for a mower of the type having a frame and a cutter bar pivoted on the frame and extending in a direction transverse to the direction of travel of the mower; said breakway mechanism including a lever fixed in relation to and extending generally forward of said cutter bar adjacent said frame, a first plate fixed on said frame adjacent said lever and defining a fore-and-aft directed slot spaced from the forward edge of said first plate, a reciprocable and rotatable second plate pivotally connected to said first plate, guide means on said second plate positioned for reciprocation of said second plate along said slot, a link pivotally connected to said lever and to said second plate and positioned to swing said second plate about the pivotal connection of said first and second plate, a compression spring extending forwardly of said first plate and having one end connected to said second plate and positioned to exert a force on said second plate tending to displace said second plate in the direction of the slot, an anchorage connected to said first plate and to the other end of said compression spring, a release arm pivotally connected at one end to said first plate and positioned to engage with said second plate to prevent swinging of said second plate, said arm having a roller at its other end for mating with an edge portion of said second plate in one position of said arm and said second plate, and said arm having a stop means positioned to engage with said frame to prevent swinging of said arm, and a tension spring connected at one end to said release arm and connected at the other end to said lever and to said link and being in position to tend to rotate said second plate in one direction and to urge said release arm roller in contact with said edge portion of said second plate in one position of said breakaway mechanism and said tension spring also being positioned in another position of said breakaway mechanism by reason of said cutter bar encountering an obstruction, to tend to rotate said second plate in the other direction.

References Cited
UNITED STATES PATENTS

| | | | |
|---|---|---|---|
| 2,166,967 | 7/1939 | Raney et al. | 56—25 |
| 2,240,292 | 4/1941 | Frederiksen | 56—25 |
| 2,310,388 | 2/1943 | Blair | 56—25 |
| 2,318,274 | 5/1943 | Westerlund | 56—25 |
| 2,520,107 | 8/1950 | Vutz | 56—25 |
| 2,520,743 | 8/1950 | Tanke | 56—25 |
| 2,775,855 | 1/1957 | Richey | 56—25 |
| 2,932,933 | 4/1960 | Elfes et al. | 56—25 |
| 3,114,996 | 12/1963 | Yeske | 56—25 |
| 3,151,430 | 10/1964 | Wathen et al. | 56—25 |
| 3,234,718 | 2/1966 | Wathen | 56—25 |

ALDRICH F. MEDBERY, *Primary Examiner.*